No. 694,673. Patented Mar. 4, 1902.
F. SCHWEDTMANN & G. E. WELLS.
TRANSFORMER.
(Application filed Aug. 17, 1901.)
(No Model.) 4 Sheets—Sheet 2.
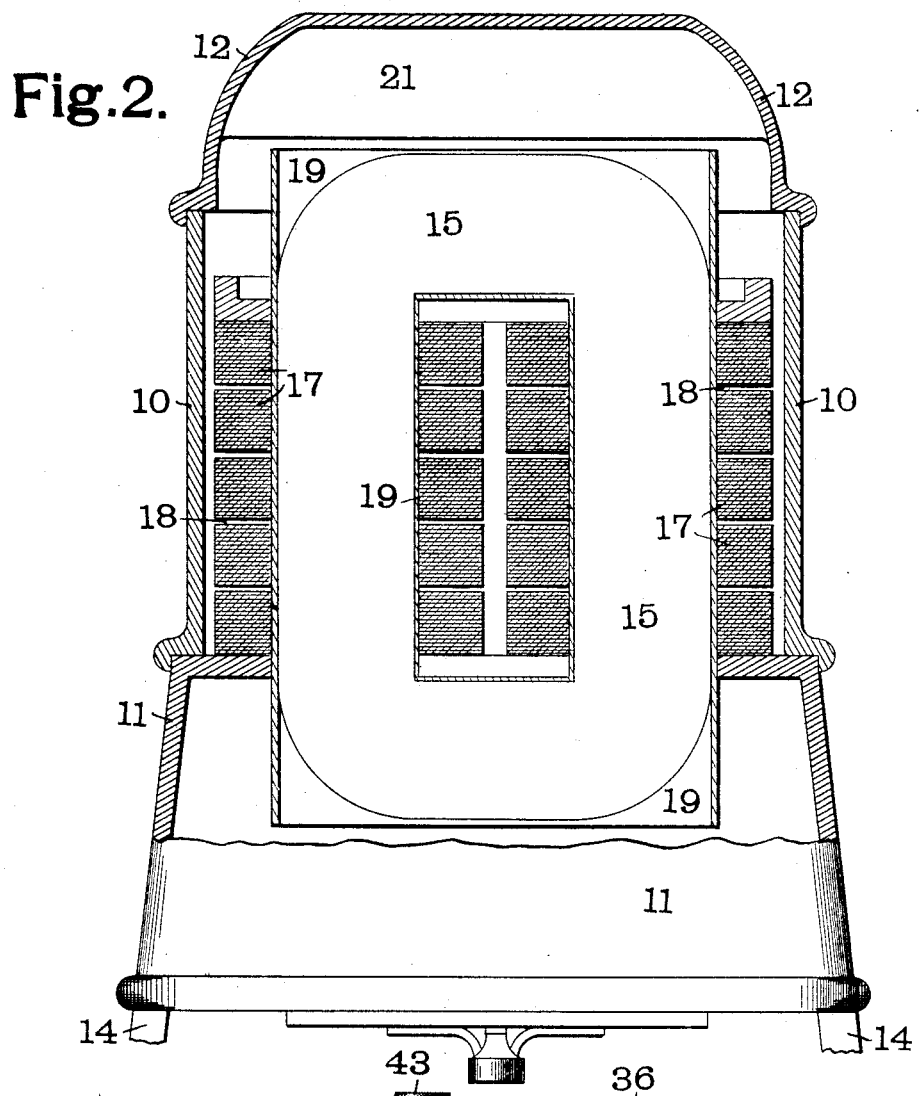
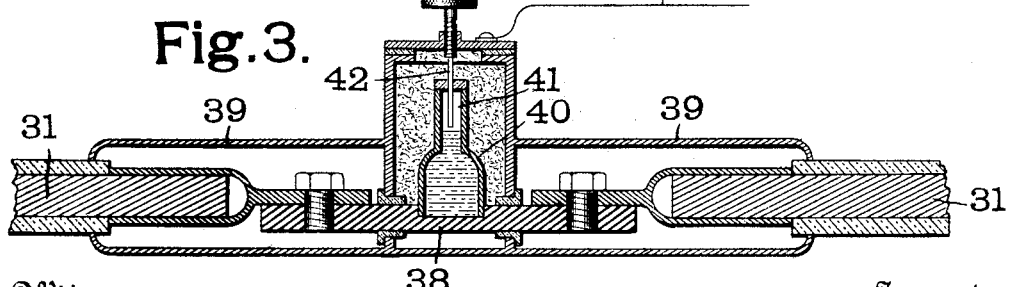
Witnesses
W. H. Alexander.
J. R. Watkins.
Inventors
F. Schwedtmann
George E. Wells
By Attorneys
Fowler + Bryson No. 694,673. Patented Mar. 4, 1902.
F. SCHWEDTMANN & G. E. WELLS.
TRANSFORMER.
(Application filed Aug. 17, 1901.)
(No Model.) 4 Sheets—Sheet 3.
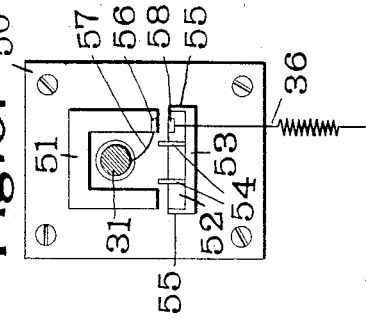
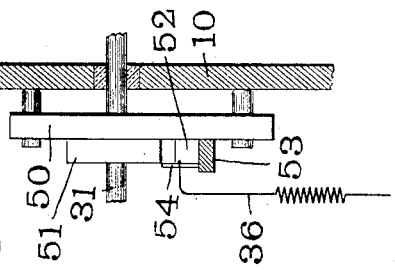
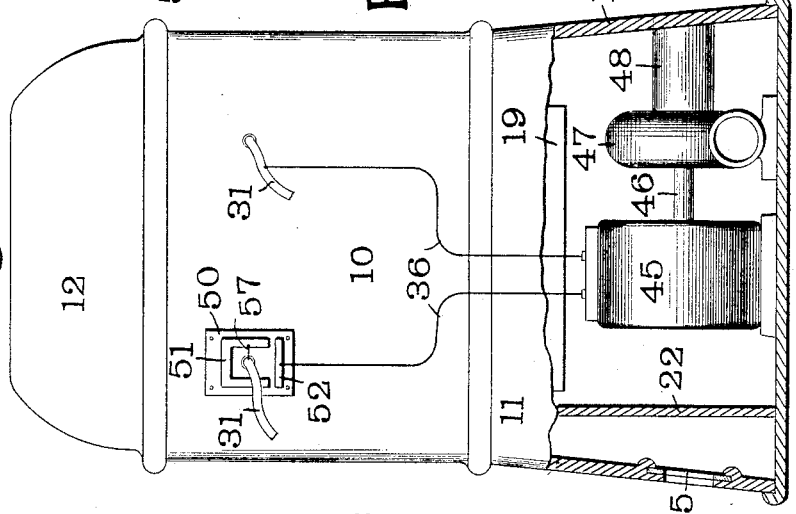
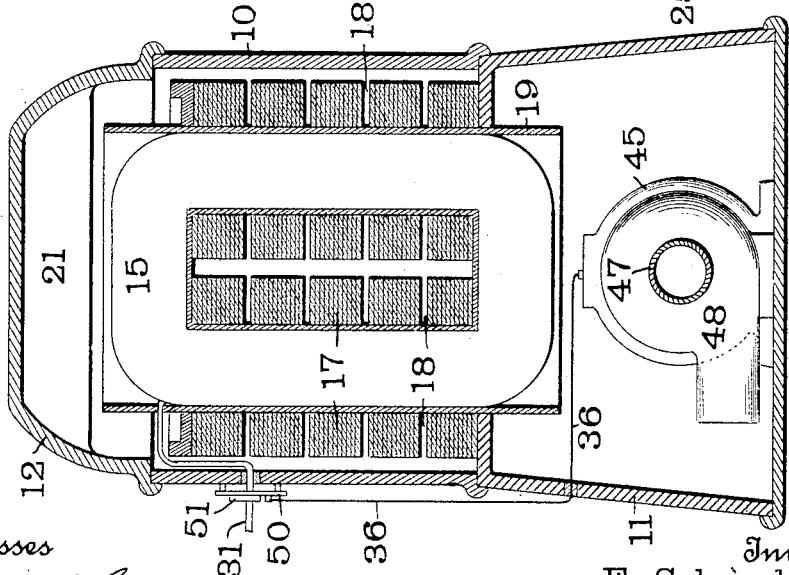
Witnesses
W. A. Alexander
J. R. Watkins
Inventors
F. Schwedtmann
George E. Wells
By Attorneys
Fowler & Bryson

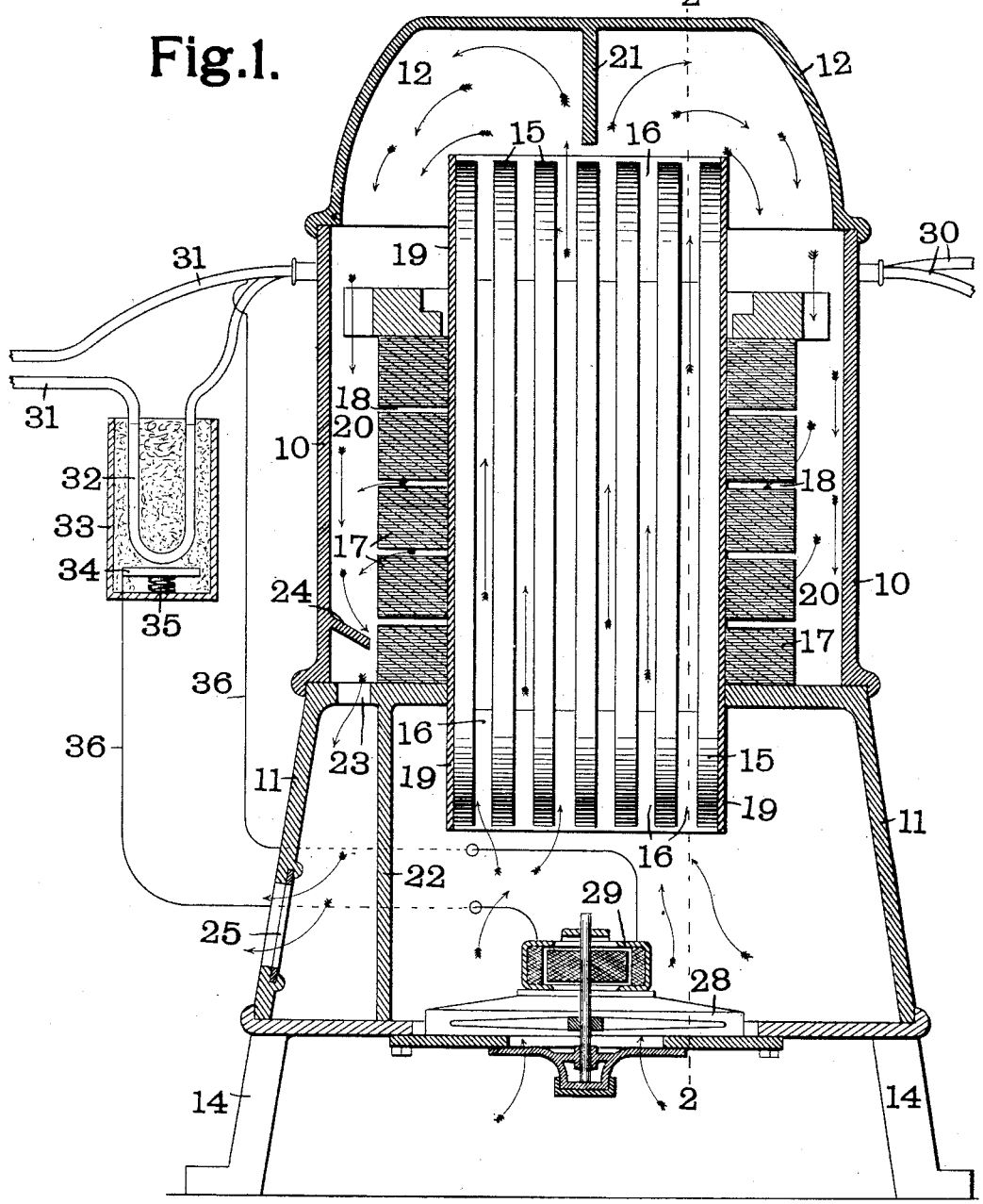

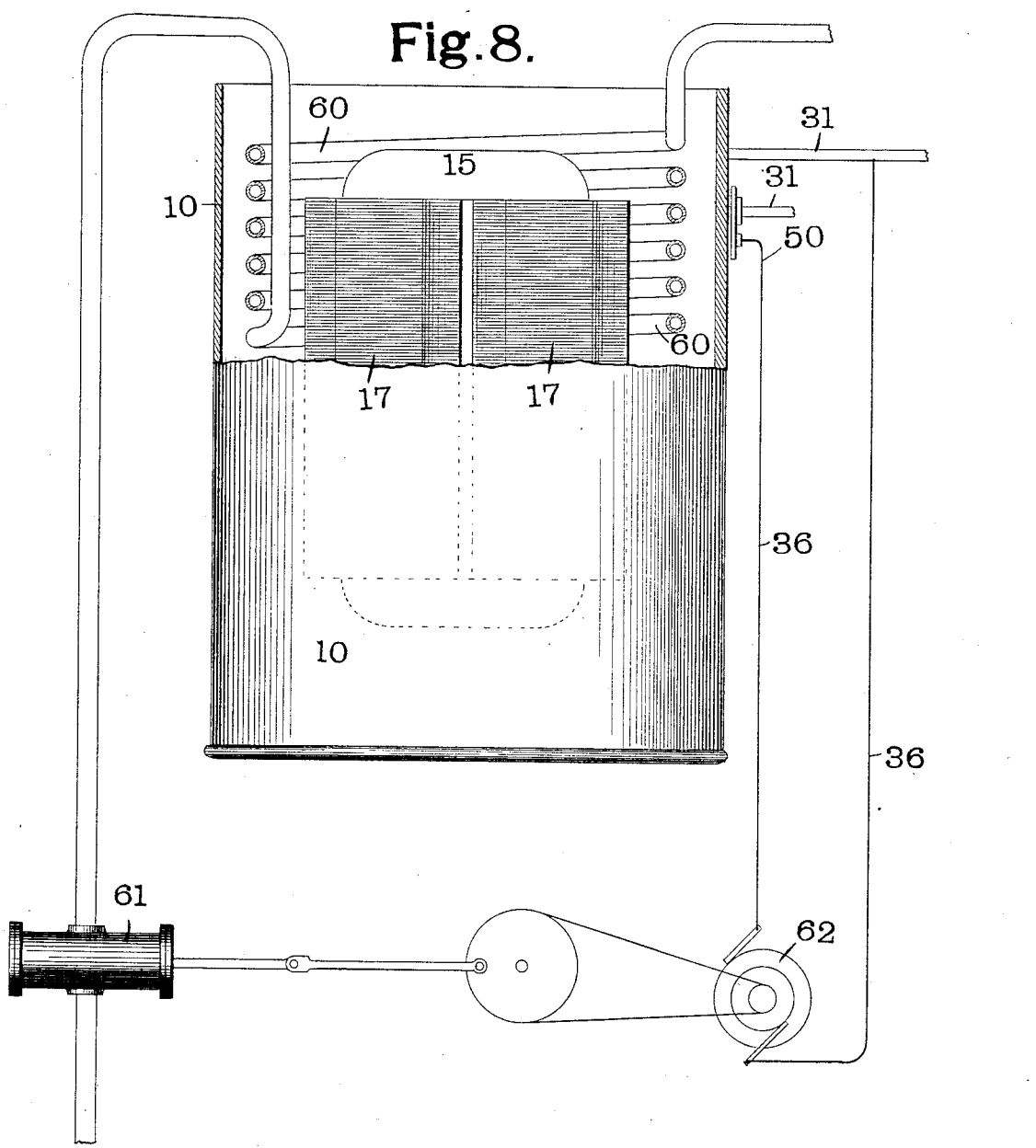

UNITED STATES PATENT OFFICE.

FERDINAND SCHWEDTMANN AND GEORGE E. WELLS, OF ST. LOUIS, MISSOURI.

TRANSFORMER.

SPECIFICATION forming part of Letters Patent No. 694,673, dated March 4, 1902.

Application filed August 17, 1901. Serial No. 72,351. (No model.)

*To all whom it may concern:*

Be it known that we, FERDINAND SCHWEDTMANN and GEORGE E. WELLS, citizens of the United States, residing at the city of St. Louis, in the State of Missouri, have invented a certain new and useful Transformer, of which the following is such a full, clear, and exact description as will enable any one skilled in the art to which it appertains to make and use the same, reference being had to the accompanying drawings, forming part of this specification.

Our improvements relate to electric transformers, and more particularly to means for automatically supplying a current of air to the coils of a transformer to cool the same when the current has reached a predetermined amount.

Our invention consists, primarily, in the combination, with a casing, of primary and secondary windings within said casing, air-passages for cooling said windings, a fan or blower, and means for automatically starting said fan or blower when the current in said transformer has reached a predetermined amount.

Our invention also consists in certain other novel features and details of construction, all of which will be described in the following specification and pointed out in the claims affixed hereto.

In the accompanying drawings, which illustrate a transformer made in accordance with our invention, Figure 1 is a vertical cross-section. Fig. 2 is a section on the line 2 2 of Fig. 1, a portion of the base being shown in elevation. Fig. 3 is an enlarged sectional view of a modified form of the device for controlling the fan or blower. Fig. 4 is a view similar to Fig. 2, but showing slight modifications. Fig. 5 is a view, partly in section and partly in elevation, of the transformer shown in Fig. 4. Fig. 6 is an enlarged detailed view of the controlling device shown in Figs. 4 and 5. Fig. 7 is a side view, partly in elevation and partly in section, of the parts shown in Fig. 6; and Fig. 8 is a view, partly in elevation and partly in section, showing a modified form of transformer.

Like marks of reference refer to similar parts in the several views of the drawings.

The housing of the transformer is composed of three parts—the body part 10, base 11, and an imperforate cap 12. The base 11 may be supported by feet 14, as shown in Figs. 1 and 2.

We will now describe one form of arrangement of the core and coils which may be used in connection with our invention. Our invention is not limited to the use of such construction, however, as any suitable arrangement of the core and coils may be used in which air-passages are provided for the cooling of the coils.

Within the body 10 of the housing are primary and secondary coils 15, arranged some distance apart, so as to leave air-spaces 16 between them. Surrounding the coils 15 is the core 17, formed of laminated iron in the usual manner and provided with lateral passages 18. Surrounding the coils 15 and separating them from the core 17 is an open-ended case 19 of insulating material. The core 17 is arranged in the housing, so as to leave air-spaces 20, through which the air may pass down past the core after it has been forced up through the passages 16. The imperforate cap 12 prevents its escape at the top of the transformer. The cap 12 is provided with a partition 21, so as to equally divide the currents of air passing up through the passages 16, and thus forcing the air to pass down at both sides of the core 17. The base 11 is provided with two compartments by a partition 22. Into one of these compartments opens a passage 23, communicating with one of the passages 20. Above this passage 23 is placed a deflecting-plate 24. After passing through the opening 23 the air passes out through a grating 25, by means of which the flow of air may be regulated.

Having particular reference now to Figs. 1 and 2, within the base 11 is a fan or blower 28, driven by a motor 29. The object of this fan or blower is to force the air up through the passages 16. 30 are the wires leading to the primary coils of the transformer, and 31 are the wires leading from the secondary coils. In one of the wires 31 is placed a U-shaped piece of metal 32, which is adapted to expand by the heat caused by the current passing through the same. This U-shaped part 32 is inclosed in a receptacle 33 and preferably surrounded by asbestos or some other non-conductor of heat. Placed near the part 32 is a contact-piece 34, with which the said part 32 is adapted to come in contact when it is expanded by the passage of the current through the wire 31. This contact-piece 34 is mounted upon a spring 35, so that it will yield to allow the further expansion of the part 32 after the parts 32 and 34 have come in contact. Leading from the part 34 to the motor 29 is one end of a wire 36, the other end of which is attached to the secondary line-wire 31. Contained in the circuit of the wire 36 is the motor 29, above referred to.

In Fig. 3 is shown a modified form of the device for controlling the current from the fan or blower 28. In one of the secondary wires 31 is inserted a strip of metal 38, preferably iron. This strip of metal is preferably inclosed in a receptacle 39. Secured to the face of the strip 38 is a cup 40, preferably having a reduced neck 41. This cup is partially filled with mercury, as shown in the drawings. The cup is preferably surrounded with asbestos or other non-conductor of heat. Projecting into the neck 41 of the cup is a rod 42, the upper part of which is screw-threaded, with a milled head 43, by means of which the distance of the end of the rod 42 from the mercury in the cup 40 can be adjusted. When the current in the wire 31 has reached a predetermined amount, the strip 38 will be heated sufficiently to cause enough expansion of the mercury in the cup 40 to bring said mercury in contact with the end of the rod 42, thus completing the circuit through the wire 36, and consequently through the motor 29.

In Figs. 4 to 7 we have shown some further modifications. In place of the horizontally-disposed motor 29 we provide an upright motor 45, which is attached by means of a shaft 46 to a fan or blower 47, which discharges into the base 11 and is provided with an intake 48. In these figures we have also shown a modified form of the device for closing the circuit through the motor. Around one of the secondary wires 31 is secured a base-plate 50, preferably of insulating material. Carried by the plate 50 is a U-shaped piece of soft iron 51, which is adapted to be magnetized by the flow of current through the said wire 31. Arranged beneath the U-shaped iron 51 is an armature 52, which is adapted to be attracted by the part 51 when current is flowing through the wire 31. The armature 52 is supported by a shelf 53, Figs. 6 and 7, and is guided by pins 54 and end pieces 55. Secured to one arm of the U-shaped part 51 is a strip of copper or other conducting material 56. This strip 56 is connected to the wire 31 by means of a wire 57. Carried by the armature 52 is a strip of copper or other conducting material 58, which is adapted to make contact with the strip 56 when the armature is raised. Connected to the strip 58 is one end of a wire 36, the other end of which is connected to the other secondary 31, and in which is contained the motor 45.

In Fig. 8 we have shown a transformer in which the coils and core in place of being cooled by air are cooled by a suitable liquid. Within the transformer-casing 10 are arranged coils of pipe 60, through which the cooling fluid is forced by means of a pump 61. The pump 61 is driven by means of a suitable motor 62. This motor 62, like the motors 29 and 45, may be driven by any suitable source of power, but is preferably connected to the secondary wires 31 of the transformer by means of wires 36. The starting of the motor 62 may be controlled by any of the devices above described.

In the operation of our transformer when the current has reached a certain amount in the secondary wires 31 the circuit will be closed through the wire 36, thus starting the motor 29 or 45 and actuating the fan or blower 28 or 47. In the construction shown in Fig. 1 this will be accomplished by the expansion of the U-shaped part 32 and its consequent contact with the part 34. In the construction shown in Fig. 3 it will be accomplished by the expansion of the mercury in the cup 40, and the consequent contact of the said mercury with the rod 42. In the construction shown in Figs. 4 to 7 it will be accomplished by the magnetizing of the part 51, and the consequent attraction of the armature 52, which will thus bring the strips 56 and 58 into contact to close the circuit through the wires 36.

It will be seen that with our transformer whenever the current has reached a certain predetermined amount the circuit will be closed through the motor and the fan or blower thus actuated to supply air to cool the coils of the transformer and that the fan or blower will continue to be actuated until the current has fallen below the predetermined amount, when the circuit will be broken and the fan or blower stopped.

We are aware that it has heretofore been proposed to provide a transformer with a fan or blower which was operated during the entire time the transformer was in use and the speed of which was varied proportional to the amount of current flowing through the transformer, and hence do not claim such construction.

Having fully described our invention, what we claim as new, and desire to secure by Letters Patent of the United States, is—

1. In a transformer, the combination with a housing, of primary and secondary windings in said housing, a passage for the flow of a cooling fluid, mechanism for supplying fluid to said passage, and means for automatically starting said mechanism when the current of said transformer has reached a predetermined amount.

2. In a transformer, the combination with a housing, of primary and secondary windings in said housing, air-passages for cooling said windings, a fan or blower for supplying air to said passages, and means for automatically starting said fan or blower when the current in said transformer has reached a predetermined amount.

3. In a transformer, the combination with a housing, of primary and secondary windings in said housing, air-passages for cooling said windings, a fan or blower for supplying air to said passages, and means situated in the secondary circuit of said transformer for automatically starting said fan or blower when the current has reached a predetermined amount.

4. In a transformer, the combination with a housing, of primary and secondary windings in said housing, air-passages for cooling said windings, a fan or blower for supplying air to said passages, and magnetic means controlled by the current flowing in the transformer for automatically starting said fan or blower when the current in said transformer has reached a predetermined amount.

5. In a transformer, the combination with a housing, of primary and secondary windings in said housing, air-passages for cooling said windings, a fan or blower for supplying air to said passages, and magnetic means situated in the secondary circuit of said transformer for automatically starting said fan or blower when the current has reached a predetermined amount.

In testimony whereof we have hereunto set our hands and affixed our seals in the presence of two subscribing witnesses.

FERD. SCHWEDTMANN. [L. S.]
    GEORGE E. WELLS. [L. S.]

Witnesses:
 JAMES H. BRYSON,
 W. A. ALEXANDER.